Nov. 18, 1958　　　M. H. FARMER　　　2,861,027
LIQUID-LIQUID EXTRACTION TOWER
Filed Feb. 16, 1956

Michael H. Farmer　　Inventor

By Richard H. Nagel　Attorney

United States Patent Office 2,861,027
Patented Nov. 18, 1958

2,861,027

LIQUID-LIQUID EXTRACTION TOWER

Michael H. Farmer, Roselle Park, N. J., assignor to Esso Research and Engineering Company, a corporation of Delaware Application February 16, 1956, Serial No. 565,822

3 Claims. (Cl. 196—14.52)

The present invention relates to a liquid-liquid extraction apparatus. More specifically, it relates to an improved apparatus for the removal of desirable or objectionable ingredients by intimately contacting two immiscible liquids each having a different specific gravity.

It is well known in the art to employ selective solvents and multistaged extraction towers to remove impurities from liquids. For instance, phenol, cresol and nitrobenzene have been used to extract low viscosity index constituents from petroleum oils. Usually, two immiscible liquids having different specific gravities are used in these liquid-liquid extraction towers. The more dense liquid is introduced near the top of the vessel, and allowed to flow across the stages and down the conduits to the bottom of the tower where it is withdrawn. The less dense liquid is fed through a conduit near the base of the tower, and flows upwardly through the vessel being mixed with, and separated from the heavy solvent in each stage until it reaches the top of the tower where it is withdrawn, and stripped of the solvent by some suitable means, as by distillation.

One source of energy utilized in these towers is the buoyant energy supplied by the liquids themselves. In some instances mechanical mixers, or agitators are employed to bring about a more intimate contact of the liquids at each stage.

One object of the present invention is to disclose a liquid-liquid extraction apparatus in which the discontinuous phase liquid contacts fresh continuous phase prior to passing into the main mixing area.

Another object of this invention is to reduce hydraulic instability which causes the trays to dump. In the event that instability does occur only fresh continuous liquid will flow into mixing area, thus eliminating the chance of contaminating the discontinuous phase liquid above the tray with spent continuous phase liquid. The description below will explain how this is achieved.

A further object is to disclose a more efficient stage having two dispersion devices.

In the past, attempts have been made to improve dispersing devices. For instance, the use of serrated weirs, in the place of straight edged weirs, increases the contacting surface of the discontinuous phase liquid, and thereby renders the tower more efficient. The present invention now permits an even more thorough extraction by the same number of trays, and in substantially the same amount of space than was heretofore found possible. The improvement disclosed herein is applicable to any liquid-liquid system with any modifications which may be employed in such process.

Before describing the present invention it would be desirable to define several of the terms to be used herein. For example, the efficiency of the apparatus may be determined by comparing the quality and/or quantity of the yield of the improved tower with another tower operating on the same feed stock; or comparing its yield with a set of theoretical contacting stages. A theoretical stage may be established by contacting two liquids intimately to equilibrium in a batch mixer followed by a complete settling in a batch settler. The term "continuous phase liquid" refers to the liquid occupying the major portion of the vessel, while the term "discontinuous phase liquid" refers to the liquid which occupies the minor portion of the vessel, and which is dispersed in the continuous phase liquid. Of course, it is understood that each phase may include a minor portion of the other liquid since generally the liquids have a certain affinity for each other.

Having defined some terms that will be referred to in the present description, reference is now made to the attached drawings wherein.

Figure 1:
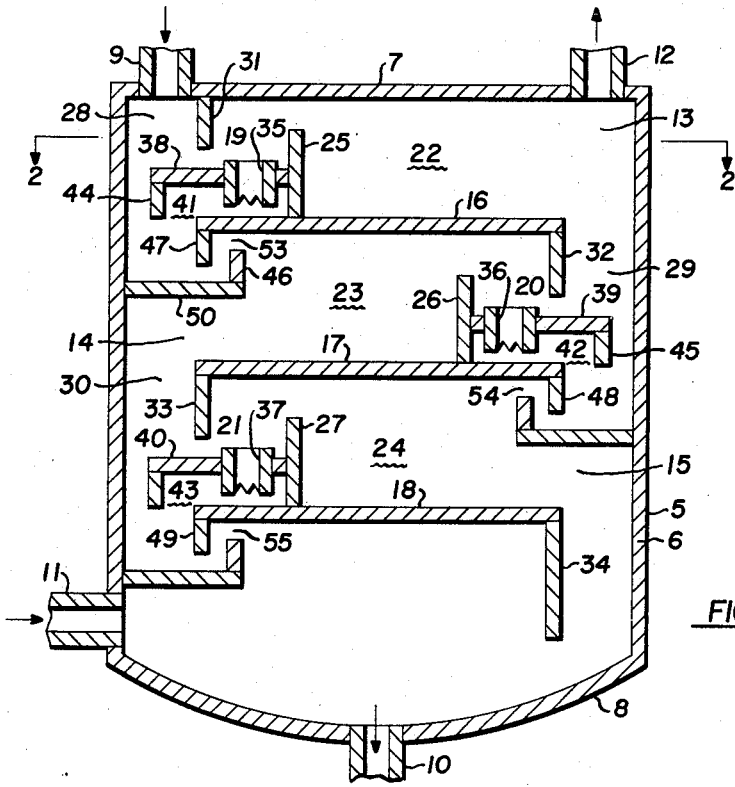
Figure 1 shows diagrammatically a vertical section of one form of apparatus that embodies certain features of the invention.
Figure 2:
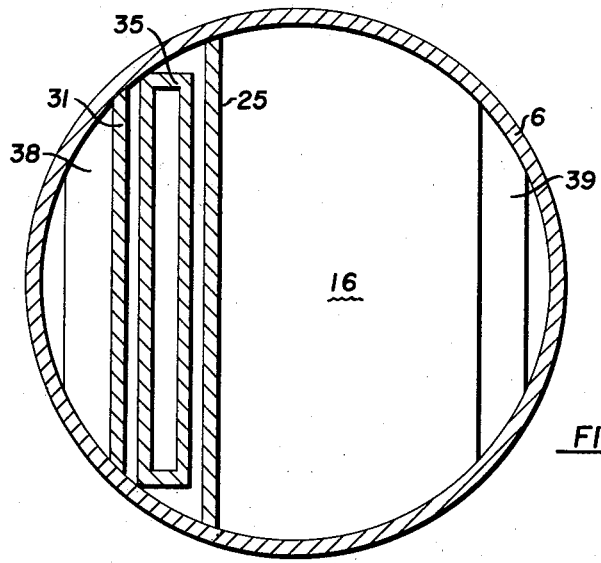
Figure 2 is a cross-section view taken along plane 2—2 of the apparatus illustrated in Figure 1.

In discussing the figures, it will be noted that the apparatus depicted therein is adapted for use with liquid-liquid systems in which the continuous phase liquid is denser than the discontinuous phase liquid.

Referring to the figures, the apparatus comprises a cylindrical, vertically disposed vessel 5 which has side walls 6, a top plate 7 and a bottom plate 8. The vessel also has several conduits for introducing and withdrawing the continuous and discontinuous phase liquids. The continuous phase liquid is introduced at the top of the vessel through conduit 9 and is withdrawn at the bottom of the vessel through conduit 10, while the discontinuous phase liquid is introduced near the bottom of the vessel through conduit 11 and withdrawn from the top of the vessel through conduit 12.

The vessel is divided into three contacting stages 13, 14 and 15, by vertically spaced horizontally disposed imperforate plates 16, 17 and 18, having downward vertically disposed lip members 47, 48 and 49, respectively, attached to one side and downward vertically disposed lip members 32, 33 and 34, respectively, attached to the diametrically opposite side. Of course, it is understood that a commercial tower may have from about 8 to 20 such stages, and it is usually preferred to have from about 10 to 18 stages. In turn, each stage is laterally separated into a mixing and settling zone by a vertically positioned imperforated plate. For example, contacting stage 13 is divided into mixing zone 19 and settling zone 22 by vertical plate 25 which is sealed along its lower edge to horizontal plate 16. The upper edge of plate 25 terminates vertically in spaced relation with the vessel's top plate 7. In like manner, stage 14 has a mixing zone 20 and a settling zone 23 separated by vertical plate 26 and stage 15 has a mixing zone 21 and a settling zone 24 separated by vertical plate 27.

If desired each mixing zone may have a suitable means for contacting the continuous and discontinuous phase liquids. For example, paddles, propellers or a suitable packing material, such as Berl saddles, Raschig rings, wire mesh etc., may be employed.

Each contacting stage is provided with a downcomer conduit for conveying continuous phase liquid from the adjacent stage above, or from a point outside the vessel, to the mixing zone. For example, stage 13 has a vertically disposed conduit 28 which is formed by the walls 6 of the vessel and vertical plane 31 which is sealed at its upper end to the top of the vessel 7. Conduit 28 is employed to convey continuous phase liquid from conduit 9, outside the vessel, to contacting stage 13. Likewise, stage 14 has a downcomer conduit 29, formed by the walls 6 of the vessel and vertical lip member 32, which conveys the continuous phase liquid from settling zone 22 of stage 13 to mixing zone 20, and stage 15 has a downcomer conduit 30 which conveys the continuous phase liquid from settling zone 23 of stage 14 to mixing zone 21. The downcomer conduits are in diametrically opposite relation one to the other to allow horizontal flow of the continuous phase liquid in opposite directions through the settling zones of the successive stages.

It is preferred that the downstream part of each downcomer overlaps the vertical plate which separates the mixing and the settling zone. Thus, in stage 13, downcomer 28 extends slightly below the upper end of plate 25.

Each contacting stage in the vessel is provided with a conduit for introducing the discontinuous phase liquid from a collecting area under the horizontal imperforate plate forming the major portion of the tray to the mixing area of the stage. Thus, stage 13 has a riser conduit 35 which extends vertically in opposite directions beyond horizontal plate 38 which is attached at one end to vertical separator plate 25. Conduit 35 extends vertically in both directions from plate 38 in order to prevent discontinuous phase liquid from wetting the surfaces of plate 38 and flowing along the surface of the plate instead of directly into the mixing zone 19. The lower edge of conduit 35 terminates in a trap 41 which is formed by a portion of horizontal imperforate plate 16 and vertical imperforate plate 25, together with horizontal plate 38, which is attached to plate 25 at one side and has a vertical baffle 44 attached to a second side which forms a conduit with the wall 6 of the vessel.

A conduit or liquid passageway 53 in stage 13, is formed by two vertical lip members in parallel relationship to each other, namely lip members 46 and 47, each terminating intermediate to and spaced from horizontal imperforate plates 16 and 50, respectively. The lower edge of vertical lip member 47 forms a straight edged underflow weir for the dispersion of discontinuous phase liquid which flows through conduit 53 into trap 41, in which there is fresh continuous phase liquid flowing from the stage above.

The lower edge of conduit 35 constitutes a weir for the uniform flow of discontinuous phase liquid collected in trap 41 through conduit-weir 35 into mixing area 19 of stage 13. The lower edge of conduit 35 may be absolutely smooth, thereby constituting a straight edged weir, but it is perferred that the lower edge be serrated to form a notched type weir, for example a V-notched trapezoidal or rectangular weir. The notched weir should be of the V-notched type which has notches wide and deep enough to accommodate the entire range of expected flow rates for the discontinuous phase liquid. It is most desirable that the streams of discontinuous phase liquid passing through the riser conduit be distributed in a substantially uniform manner into the mixing area. It is also preferred that a plurality of riser conduits and weirs be employed in each stage rather than a single large conduit and weir.

Briefly, the operation of a liquid-liquid extraction tower may be described as follows:

The vessel is filled with continuous phase liquid, although it may be first filled with discontinuous phase liquid, by means of a conduit at the top of the tower and withdrawn through a conduit at the bottom of the tower. The discontinuous phase liquid is then introduced near the bottom of the vessel and being of a lower specific gravity, rises in the tower and collects under the horizontal imperforate plate of the lowest stage. When a sufficient depth of discontinuous phase liquid has been reached, a liquid seal is produced in conduits 53, 54 and 55 between the continuous phase liquid in the upper part of the stage and the discontinuous phase liquid under horizontal plates 16, 17 and 18. The discontinuous phase liquid then flows under vertical baffles 47, 48 and 49 which serve the function of straight edged weirs by dispersing the discontinuous phase liquid into the continuous phase liquid existing in traps 41, 42 and 43. The discontinuous phase liquid collects under horizontal plates 38, 39 and 40 and after attaining the necessary depth, flows through conduits 35, 36 and 37 into mixing areas 19, 20, and 21 where it is once again dispersed in the continuous phase liquid. It then collects under horizontal plates 16 and 17, and the vessel's top plate 7, and moves horizontally across each stage into the respective settling zones. The discontinuous phase liquid that collects in settling zone 22 is withdrawn from the vessel by means of conduit 12.

There are several advantages derived from the use of the apparatus just described over conventional towers. In the present invention the discontinuous phase liquid is contacted with the continuous phase at two points on each stage, thus permitting a more intimate mixture, and therefore a more efficient extraction without substantially increasing the height of the tower. What occurs may be briefly described as follows:

The discontinuous phase liquid which collects under horizontal plate 18, in stage 15, flows through conduit 55, filling it so to form a liquid seal between the continuous phase liquid below the stage and the same liquid above the stage so that it is forced to flow through the mixing zone 21 and into settling zone 24 from which it flows through a downcomer conduit to the stage below. When conduit 55 is filled, discontinuous phase liquid commences to flow under the straight edged weir 49 which disperses it into the unspent solvent coming through downcomer conduit 30 from stage 14. It collects under horizontal plate 40 where it is bathed with fresh solvent, for example phenol, until it flows under V-notched weir, through conduit 37 and into mixing zone 21. In conventional towers the discontinuous phase liquid flows from under the tray directly into the mixing zone, or first passes through a chamber in which there is spent continuous phase liquid which may contaminate the discontinuous phase liquid flowing through it. Thus the present invention not only permits a more intimate contact with fresh solvent in about the same space, but also eliminates the chamber under the riser which may be a source of contamination, and substitutes an open chamber which allows the discontinuous phase liquid therein to be bathed with fresh solvent while waiting to be redispersed in the mixing zone above.

The improved apparatus described herein greatly reduces the chance of producing hydraulic unbalance. This is achieved by having an upward flow of the more dense liquid through the conduit riser and into the mixing zone. The pressure differential produced by the downward flow of the denser liquid on one side of the stage is therefore compensated by the upward flow of this same liquid on the opposite side of the stage.

A number of additional features may be incorporated in the apparatus just described. For example, liquids may be injected into the tower at various places to perfect the separation or dispersion of the continuous and discontinuous phase liquids. In liquid-liquid extraction towers employing phenol as the solvent, additional phenol or phenol aqueous solutions may be employed to assist the separation of the liquids in the settling zones. Also substantially vertically disposed baffles may be attached to the underside of the major imperforate horizontal plate in each stage to trap the discontinuous phase liquid and prevent its depletion if hydraulic unbalance occurs.

It is a preferred embodiment of this invention that the straight edged vertical baffles 47, 48 and 48 be serrated or notched, just like the weir at the base of conduit 35, in Figure 1, so that a more uniform stream of discontinuous phase liquid is dispersed into traps 41, 42 and 43, respectively.

It will be realized that a number of variations may be incorporated in the present invention without departing from the scope thereof. For instance, conventional emulsion breaking means, such as bundles of wire mesh and the like may be used in the various setting zones to achieve rapid phase separation. Further, the apparatus may be constructed of any conventional materials and may be provided with the usual back pressure control valves, gauges, heaters, controllers, and the like.

It is also understood that the number of stages in the improved apparatus disclosed herein is not limited to that shown in Figure 1, but rather, the towers may have as many stages as is necessary to achieve the desired degree of extraction. Also, since the efficiency of these stages is approximately 50 to 60% of the theoretical stages, the number of stages necessary for a commercial tower may be arrived at by multiplying the number of theoretical stages required by two.

What is claimed is:

1. An improved apparatus for contacting two incompletely miscible liquids, comprising an upright vessel having conduits for introduction and withdrawal of the liquids; a plurality of contacting stages disposed one above the other, each stage comprising an upper imperforate horizontal plate extending across the major portion of the cross section of the vessel and having downwardly extending vertical lip members on diametrically opposite sides, one of said lip members being adapted to form an underflow weir, a smaller imperforate plate disposed below said first named plate attached at one end to the wall of said vessel and extending substantially horizontally inwardly to a point beyond said underflow weir member, an upwardly extending vertical lip attached to the other end of said smaller plate forming a tortuous path with said underflow weir member, a vertically disposed separator plate, the lower edge of which is attached to the upper side of said upper horizontal imperforate plate and extending to a point above the lower surface of the lip member opposite said last named underflow weir member, a horizontal plate attached on one side to said separator plate and extending towards the adjacent wall of said vessel to a point closer to said wall than said weir member and terminating in a downwardly extending baffle, a conduit weir member extending through said last named plate, and a downcomer formed by the second lip member of said upper imperforate horizontal plate with the walls of said vessel, said downcomer extending to a point beyond the upper edge of the vertical separator plate of the next lower stage, said last named separator plate being on the diametrically opposite side of said vessel from the separator plate of said first stage.

2. An apparatus as defined in claim 1 in which the conduit weir is serrated.

3. An apparatus as defined in claim 2 in which the serrated conduit-weir is V-notched.

References Cited in the file of this patent

UNITED STATES PATENTS

| | | |
|---|---|---|
| 2,150,491 | Cope | Mar. 14, 1939 |
| 2,476,095 | Houghland | July 12, 1949 |
| 2,667,407 | Fenske | Jan. 26, 1954 |